(12) United States Patent
Garrett

(10) Patent No.: US 8,707,326 B2
(45) Date of Patent: Apr. 22, 2014

(54) PATTERN MATCHING PROCESS SCHEDULER IN MESSAGE PASSING ENVIRONMENT

(75) Inventor: Charles D. Garrett, Woodinville, WA (US)

(73) Assignee: Concurix Corporation, Kirkland, WA (US)

( * ) Notice: Subject to any disclaimer, the term of this patent is extended or adjusted under 35 U.S.C. 154(b) by 0 days.

(21) Appl. No.: 13/551,318

(22) Filed: Jul. 17, 2012

(65) Prior Publication Data

US 2012/0317587 A1  Dec. 13, 2012

(51) Int. Cl.
*G06F 3/00* (2006.01)
*G06F 9/46* (2006.01)

(52) U.S. Cl.
USPC .......................................... 719/310; 718/102

(58) Field of Classification Search
USPC .......................................... 719/318; 718/100
See application file for complete search history.

(56) References Cited

U.S. PATENT DOCUMENTS

| | | | |
|---|---|---|---|
| 3,643,227 A | 2/1972 | Smith et al. | |
| 4,631,674 A | 12/1986 | Blandy | |
| 5,506,987 A | 4/1996 | Abramson et al. | |
| 5,592,671 A * | 1/1997 | Hirayama | 718/104 |
| 5,900,001 A | 5/1999 | Wolczko et al. | |
| 5,903,900 A | 5/1999 | Knippel et al. | |
| 6,006,235 A | 12/1999 | Macdonald et al. | |
| 6,038,572 A | 3/2000 | Schwartz et al. | |
| 6,047,295 A | 4/2000 | Endicott et al. | |
| 6,098,080 A | 8/2000 | Endicott et al. | |
| 6,104,962 A | 8/2000 | Sastry | |
| 6,128,642 A | 10/2000 | Doraswamy et al. | |
| 6,151,583 A * | 11/2000 | Ohmura et al. | 705/7.26 |
| 6,230,183 B1 | 5/2001 | Yocom et al. | |
| 6,289,360 B1 | 9/2001 | Kolodner et al. | |
| 6,308,319 B1 | 10/2001 | Bush et al. | |
| 6,317,756 B1 | 11/2001 | Kolodner et al. | |
| 6,421,704 B1 | 7/2002 | Waldo et al. | |
| 6,484,188 B1 | 11/2002 | Kwong et al. | |
| 6,490,599 B2 | 12/2002 | Kolodner et al. | |
| 6,490,612 B1 | 12/2002 | Jones et al. | |
| 6,516,461 B1 | 2/2003 | Ichisugi | |

(Continued)

FOREIGN PATENT DOCUMENTS

EP    1912119 A    4/2008
KR    10199800795    11/1998

OTHER PUBLICATIONS

B.F. van Dongen , A Meta Model for Process Minning Data, 2005.*

(Continued)

*Primary Examiner* — Lechi Truong
(74) *Attorney, Agent, or Firm* — Russell S. Krajec

(57) ABSTRACT

Processes in a message passing system may be unblocked when messages having data patterns match data patterns of a function on a receiving process. When the match occurs, the process may be added to a runnable queue, and in some embodiments, may be raised to the top of a runnable queue. When a match does not occur, the process may remain in a blocked or non-executing state. In some embodiments, a blocked process may be placed in an idle queue and may not be executed until a process scheduler determines that a message has been received that fulfills a function waiting for input. When the message fulfills the function, the process may be moved to a runnable queue.

24 Claims, 6 Drawing Sheets

(56) References Cited

U.S. PATENT DOCUMENTS

| | | | |
|---|---|---|---|
| 6,519,615 B1 | 2/2003 | Wollrath et al. | |
| 6,542,978 B2 | 4/2003 | Goldstein et al. | |
| 6,560,773 B1 | 5/2003 | Alexander, III et al. | |
| 6,564,240 B2 | 5/2003 | Waldo et al. | |
| 6,631,466 B1 | 10/2003 | Chopra | |
| 6,658,449 B1 | 12/2003 | Brenner et al. | |
| 6,711,607 B1* | 3/2004 | Goyal | 709/203 |
| 6,728,959 B1* | 4/2004 | Merkey | 718/102 |
| 6,735,769 B1 | 5/2004 | Brenner et al. | |
| 6,738,875 B1 | 5/2004 | Wang | |
| 6,748,593 B1 | 6/2004 | Brenner et al. | |
| 6,760,736 B2 | 7/2004 | Waldo et al. | |
| 6,763,520 B1 | 7/2004 | Seeds | |
| 6,823,515 B2 | 11/2004 | Livecchi | |
| 6,832,370 B1 | 12/2004 | Srinivasan et al. | |
| 6,868,488 B2 | 3/2005 | Garthwaite | |
| 6,873,952 B1 | 3/2005 | Bailey et al. | |
| 6,912,554 B2 | 6/2005 | Yuasa | |
| 6,918,111 B1 | 7/2005 | Damron et al. | |
| 6,925,644 B2 | 8/2005 | Waldo et al. | |
| 6,954,775 B1 | 10/2005 | Shanklin et al. | |
| 6,986,140 B2 | 1/2006 | Brenner et al. | |
| 6,993,767 B2 | 1/2006 | Brenner et al. | |
| 6,999,979 B2 | 2/2006 | Garthwaite | |
| 7,003,760 B1 | 2/2006 | Das | |
| 7,016,923 B2 | 3/2006 | Garthwaite et al. | |
| 7,031,990 B2 | 4/2006 | Garthwaite | |
| 7,035,884 B2 | 4/2006 | Garthwaite | |
| 7,058,670 B2 | 6/2006 | Garthwaite | |
| 7,062,518 B2 | 6/2006 | Garthwaite | |
| 7,062,519 B2 | 6/2006 | Garthwaite | |
| 7,069,279 B1 | 6/2006 | Rau et al. | |
| 7,069,280 B2 | 6/2006 | Garthwaite | |
| 7,069,281 B2 | 6/2006 | Garthwaite | |
| 7,092,978 B2 | 8/2006 | Garthwaite | |
| 7,096,238 B2 | 8/2006 | Garthwaite | |
| 7,136,887 B2 | 11/2006 | Garthwaite et al. | |
| 7,143,124 B2 | 11/2006 | Garthwaite | |
| 7,188,129 B2 | 3/2007 | Garthwaite | |
| 7,209,935 B2 | 4/2007 | Garthwaite | |
| 7,225,439 B2 | 5/2007 | Garthwaite | |
| 7,228,541 B2 | 6/2007 | Gupton et al. | |
| 7,251,815 B2 | 7/2007 | Donovan et al. | |
| 7,308,466 B2 | 12/2007 | Houldsworth | |
| 7,404,182 B1 | 7/2008 | Garthwaite et al. | |
| 7,412,580 B1 | 8/2008 | Garthwaite | |
| 7,487,237 B2 | 2/2009 | Lloyd et al. | |
| 7,565,386 B2 | 7/2009 | Joisha | |
| 7,565,499 B1 | 7/2009 | Garthwaite | |
| 7,599,973 B2 | 10/2009 | Detlefs et al. | |
| 7,613,753 B2 | 11/2009 | Cornet et al. | |
| 7,640,544 B2 | 12/2009 | Flood et al. | |
| 7,678,884 B2* | 3/2010 | Takata et al. | 530/326 |
| 7,752,417 B2 | 7/2010 | Manczak et al. | |
| 7,797,670 B2 | 9/2010 | Bumgarner et al. | |
| 7,865,707 B2 | 1/2011 | Bittlingmayer et al. | |
| 7,890,712 B2 | 2/2011 | Bitner et al. | |
| 7,984,083 B2 | 7/2011 | Bacon et al. | |
| 7,996,446 B2 | 8/2011 | Bacon et al. | |
| 8,015,379 B2* | 9/2011 | Arimilli et al. | 711/163 |
| 8,028,277 B2 | 9/2011 | Breitgand et al. | |
| 8,055,725 B2 | 11/2011 | Alam et al. | |
| 8,108,863 B2 | 1/2012 | Rakvic et al. | |
| 8,195,886 B2* | 6/2012 | Ozer et al. | 711/133 |
| 2001/0018701 A1 | 8/2001 | Livecchi | |
| 2003/0200356 A1 | 10/2003 | Hue | |
| 2003/0212731 A1 | 11/2003 | Brenner et al. | |
| 2004/0194104 A1 | 9/2004 | Beresnevichiene et al. | |
| 2005/0066302 A1* | 3/2005 | Kanade | 717/100 |
| 2005/0071847 A1 | 3/2005 | Bentley et al. | |
| 2005/0080824 A1* | 4/2005 | Vaidyanathan et al. | 707/201 |
| 2005/0081204 A1* | 4/2005 | Schopp | 718/100 |
| 2005/0138195 A1* | 6/2005 | Bono | 709/231 |
| 2005/0144364 A1 | 6/2005 | Tu et al. | |
| 2005/0166193 A1 | 7/2005 | Smith | |
| 2005/0210472 A1 | 9/2005 | Accapadi et al. | |
| 2006/0072563 A1* | 4/2006 | Regnier et al. | 370/389 |
| 2006/0184776 A1 | 8/2006 | Bishop | |
| 2006/0271811 A1* | 11/2006 | Horton et al. | 714/4 |
| 2006/0294167 A1 | 12/2006 | Borman et al. | |
| 2007/0006293 A1 | 1/2007 | Balakrishnan | |
| 2007/0050484 A1* | 3/2007 | Oertig et al. | 709/220 |
| 2007/0288911 A1 | 12/2007 | Martin et al. | |
| 2008/0005719 A1 | 1/2008 | Morris | |
| 2008/0126453 A1 | 5/2008 | Cornet et al. | |
| 2008/0139191 A1 | 6/2008 | Melnyk et al. | |
| 2008/0271032 A1 | 10/2008 | Twaddle | |
| 2009/0089552 A1 | 4/2009 | Inchingolo et al. | |
| 2009/0235262 A1* | 9/2009 | Ceze et al. | 718/102 |
| 2010/0018701 A1 | 1/2010 | Peter et al. | |
| 2010/0318630 A1 | 12/2010 | Howell et al. | |
| 2010/0333109 A1 | 12/2010 | Milnor | |
| 2011/0067030 A1 | 3/2011 | Isard et al. | |
| 2012/0047514 A1 | 2/2012 | Seo et al. | |
| 2012/0204189 A1 | 8/2012 | Eichenberger et al. | |
| 2012/0222019 A1 | 8/2012 | Gounares et al. | |
| 2012/0222043 A1 | 8/2012 | Gounares et al. | |
| 2012/0227040 A1 | 9/2012 | Gounares | |
| 2012/0233592 A1 | 9/2012 | Gounares | |
| 2012/0233601 A1 | 9/2012 | Gounares et al. | |
| 2012/0284730 A1 | 11/2012 | Decusatis et al. | |
| 2012/0297163 A1 | 11/2012 | Breternitz et al. | |
| 2012/0317371 A1 | 12/2012 | Gounares | |
| 2012/0317389 A1 | 12/2012 | Gounares | |
| 2012/0317421 A1 | 12/2012 | Gounares | |
| 2012/0317557 A1 | 12/2012 | Garrett | |
| 2012/0317577 A1 | 12/2012 | Garrett | |
| 2012/0317587 A1 | 12/2012 | Garrett | |
| 2012/0324454 A1 | 12/2012 | Gounares et al. | |
| 2013/0067445 A1 | 3/2013 | Gounares et al. | |
| 2013/0073523 A1 | 3/2013 | Gounares et al. | |
| 2013/0073604 A1 | 3/2013 | Gounares et al. | |
| 2013/0073829 A1 | 3/2013 | Gounares et al. | |
| 2013/0073837 A1 | 3/2013 | Li et al. | |
| 2013/0074049 A1 | 3/2013 | Gounares et al. | |
| 2013/0074055 A1 | 3/2013 | Gounares et al. | |
| 2013/0074056 A1 | 3/2013 | Gounares et al. | |
| 2013/0074057 A1 | 3/2013 | Gounares et al. | |
| 2013/0074058 A1 | 3/2013 | Gounares et al. | |
| 2013/0074092 A1 | 3/2013 | Gounares et al. | |
| 2013/0074093 A1 | 3/2013 | Gounares et al. | |
| 2013/0080760 A1 | 3/2013 | Li et al. | |
| 2013/0080761 A1 | 3/2013 | Garrett et al. | |
| 2013/0081005 A1 | 3/2013 | Gounares et al. | |
| 2013/0085882 A1 | 4/2013 | Gounares et al. | |
| 2013/0117753 A1 | 5/2013 | Gounares et al. | |
| 2013/0117759 A1 | 5/2013 | Gounares et al. | |

OTHER PUBLICATIONS

Daniel Lenoski, James Laudon, Kourosh Gharachorloo, Wolf-Dietrich Weber, Anoop Gupta, John Hennessy, Mark Horowitz,and Monica S. Lam, The Stanford Dash Multiprocessor, Mar. 1992, IEEE.

International Search Report, Feb. 27, 2013, Korean Intellectual Property Office, PCT/US2012/056701.

International Search Report, Jan. 29, 2013, Korean Intellectual Property Office, PCT/US2012/043811.

International Searching Authority, International Search Report and Written Opinion, Jan. 25, 2013, PCT/US2012/041036, Korean Intellectual Property Office, Republic of Korea.

International Searching Authority, International Search Report and Written Opinion, Korean Intellectual Property Office, Mar. 12, 2013, PCT/US2012/066098.

International Searching Authority, International Search Report and Written Opinion, Korean Intellectual Property Office, Feb. 5, 2013, PCT/US2012/056704.

(56) References Cited

OTHER PUBLICATIONS

International Searching Authority, Korean Intellectual Property Office, International Search Report and Written Opinion, PCT/US2012/045964, Jan. 24, 2013.

Kistler, Thomas, "Continuous Program Optimization", PhD Dissertation, University of California, Irvine, 1999.

Kistler, Thomas, "Continuous Program Optimization: A Case Study", ACM Transactions on Programming Languages and Systems, vol. 25, No. 4, Jul. 2003, pp. 500-548.

Tong Li, Dan Baumberger, David A. Koufaty, and Scott Hahn, Efficient Operating System Scheduling for Performance-Asymmetric Multi-Core Architectures, Copyright 2007, ACM.

Yang Wang, Paul Lu, Using Dataflow Information to Improve Inter-Workflow Instance Concurrency, 2005, IEEE.

International Searching Authority, International Search Report and Written Opinion, Mar. 12, 2013, PCT/US2012/066091, Korean Intellectual Property Office, Republic of Korea (8 pgs.).

\* cited by examiner

US 8,707,326 B2

PATTERN MATCHING PROCESS SCHEDULER IN MESSAGE PASSING ENVIRONMENT

BACKGROUND

Message passing environments are a computer programming paradigm where multiple processes pass information between themselves. A message passing interface often handles the message passing operations. In many cases, message passing environments may perform several processes in parallel, with processes sharing information by passing messages.

Message passing environments may be implemented in a single computer. In such environments, a set of processes may execute on a single device. As those processes complete some tasks, a message may be generated that is passed to another process. The receiving process may then consume the message and continue processing. In many cases, the message may contain data that the receiving process may consume.

Other message passing environments may be implemented across a network with many computers. In such environments, a computer system may have a process that creates messages that are consumed by processes on other computer systems. The messages may be passed on a network that may connect all of the computers executing related processes.

SUMMARY

Processes in a message passing system may be unblocked when messages having data patterns match data patterns of a function on a receiving process. When the match occurs, the process may be added to a runnable queue, and in some embodiments, may be raised to the top of a runnable queue. When a match does not occur, the process may remain in a blocked or non-executing state. In some embodiments, a blocked process may be placed in an idle queue and may not be executed until a process scheduler determines that a message has been received that fulfills a function waiting for input. When the message fulfills the function, the process may be moved to a runnable queue.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
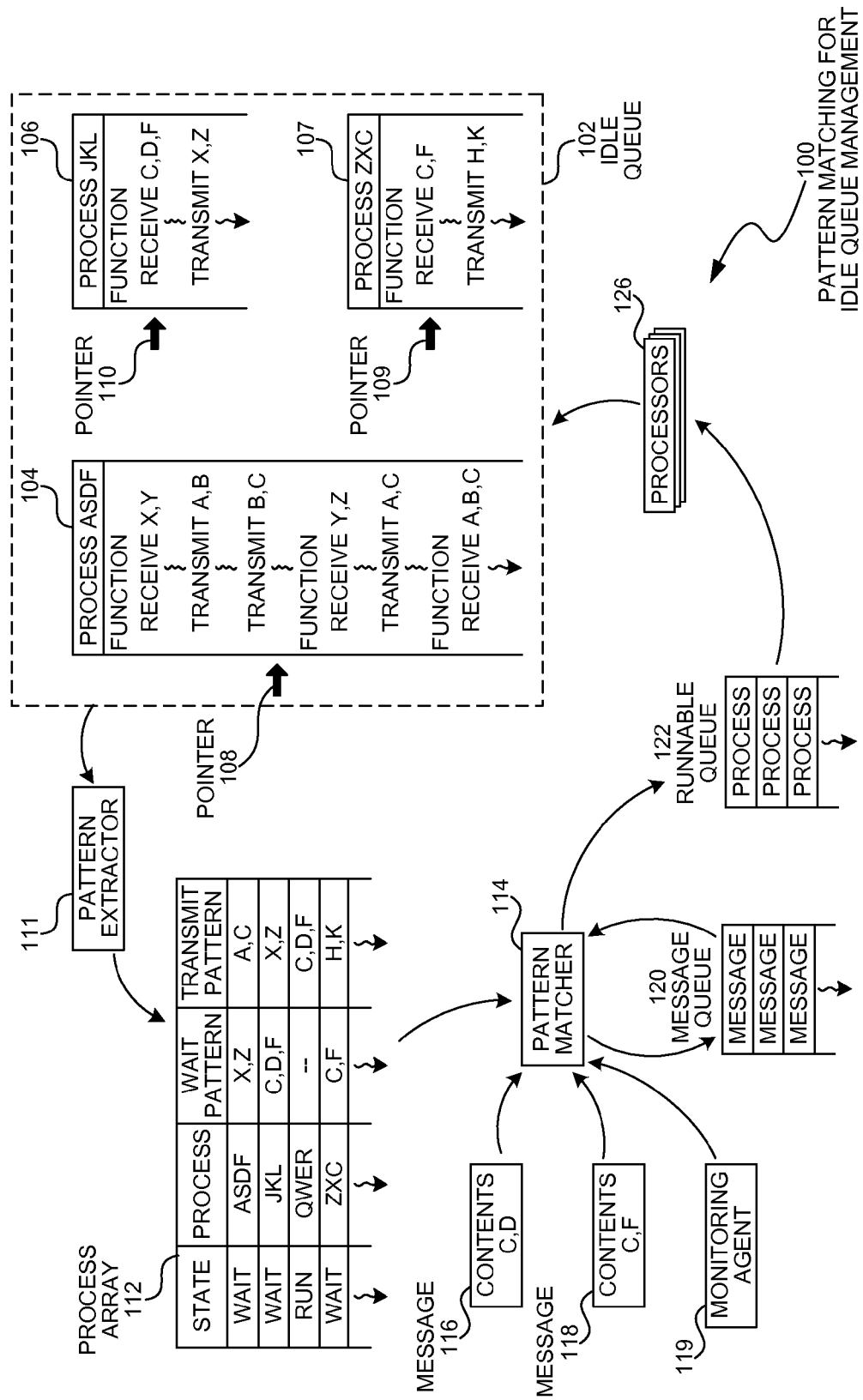
FIG. 1 is a diagram illustration of an embodiment showing pattern matching for idle queue management.

A process scheduler may compare incoming messages to patterns in a process that is in a blocked state. When an incoming message matches the pattern of data for which a process has been waiting, the process may be moved to a runnable queue and may be executed by a processor. When the process is in a blocked state awaiting input, the process may be stored in an idle queue and may not be executed.

In many execution systems where independent processes are executed, a process may receive data from other processes. Some embodiments may have an explicit message passing system that may route messages from one process to another. Other embodiments may have an implicit message passing system where one process may wait for output from another process.

An explicit message passing system may contain data that may be consumed by a receiving process. In some embodiments, the message may be addressed to a specific receiving process, while in other embodiments, a message may be matched to any receiving process that may consume a specific pattern of data.

The matching process may examine a message and compare the message to a pattern of data for which a process may be waiting. The pattern may be extracted from the process and used as metadata describing the various functions or hold points in the process. The comparison may attempt to match a given message with a pattern identified by an execution pointer at a hold point in a process. When a match is successful, the process may be executed.

Once a process has reached a point where the process may be waiting for data from another process, the process may be placed in an idle queue. Processes in an idle queue may not be executed until moved into a runnable queue.

The matching process may occur without bringing the waiting processes into an executable state. In embodiments where large numbers of processes may exist, the matching process may eliminate computationally expensive mechanism of awaking each waiting process. The matching process may use a data structure that includes the data patterns for which processes are waiting, and a matching process may scan the data structure to find a matching data pattern. Once a match is identified, the corresponding process may be caused to execute.

Causing a process to execute may merely involve placing the process in a runnable queue. A runnable queue may be a process scheduling mechanism by which a process that becomes idle may request a work item. The work item may be the process in the runnable queue. In some multiprocessor environments, multiple runnable queues may be defined for each processor or for groups of processors. In other multiprocessor environments, all processors may share a single runnable queue.

In some embodiments, a process that has a successful match may be prioritized to execute quickly. One such mechanism may be to raise the process's status in the runnable queue, such as placing the process at the top of a runnable queue. Another mechanism may be to set the priority of the process to a high level.

The metadata used in the comparison mechanism may be extracted at runtime. In some embodiments, the patterns used for comparison may be identified during a compilation process and stored for easy retrieval. During runtime, the pattern may be readily extracted from the executable code, metadata file, or other database. The compilation may occur using source code, intermediate code, or some other form of computer code.

When a compiler identifies a pattern for which a hold may occur, some of the pattern may be known at compile time and some of the pattern may not be known. When portions of the pattern are not known, the pattern may include pointers to data objects. The pointers may be traversed at runtime to retrieve data values for the pattern. The data values may be incorporated into the pattern and stored for comparison to incoming messages.

Throughout this specification and claims, the term 'message' is used to indicate information for which a process may wait. In some cases, the message may be a discrete and explicit message that may be transmitted through a communications mechanism from one process to another. In other cases, the message may be an interrupt that may be triggered by a peripheral device, such as a network interface card, storage device, input/output device, or other mechanism. In still other cases, the message may be an interrupt, daemon, or other message where the message may be implied. Some such embodiments may have a monitoring agent that may identify interrupts, memory object releases, or other items and create a message for analysis.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing various components that may allow for analyzing messages while processes are in an idle queue. Embodiment 100 shows a basic flow of information between various components that may be part of an execution environment.

The components illustrated in embodiment 100 may be elements of an operating system, runtime execution environment, or other components that execute an application. An application may be made up of multiple processes, and those processes may communicate by passing messages. The messages may transmit data, acknowledgements, interrupts, or other information between processes.

Some message passing systems may have explicit messages. Such systems may transmit and route information from one process to another, and many such systems may have sophisticated routing mechanisms that have addressing schemes, buffering mechanisms, and other features.

Some message passing systems may have implicit messages. Implicit messages may be data that one process may be awaiting from another process. The data may be, for example, a memory object that a first process may consume before proceeding. The memory object may have a lock placed on it by a second process. The lock may indicate that the second process intends to update the memory object. When the lock is lifted, an implicit message may be transmitted to the first process to resume processing.

Embodiment 100 illustrates a system where the idle processes may be left in an idle state and when a message is received that an idle process may consume, the idle process may be moved to a runnable queue and resume processing.

The mechanisms of embodiment 100 may speed up the process of matching incoming messages with idle processes. In systems without the mechanisms of embodiment 100, each idle process may be awakened and may check an incoming message. The process of awakening each process may involve loading the process into a processor's executable buffer, performing a comparison with the incoming message, and, when the match is not successful, returning the process to an idle state.

Such systems may have reasonable performance when the number of idle processes is small. However, for computing paradigms with large numbers of interrelated processes, the awakening of each process for comparison with an incoming message may be computationally expensive.

The nomenclature of a blocked process may be known as an idle process, waiting process, or other name in different computing paradigms. For the purposes of this specification and claims, the terms "idle process", "waiting process", "sleeping process", "halted process", "locked process", and "blocked process" are considered interchangeable. Still other computing paradigms may have other terminologies for the same concept.

An idle queue 102 may contain two processes 104 and 106. The idle queue 102 may contain any process that is waiting input from some other source. In some cases, the process may be waiting for output of another process, while in other cases, the process may be waiting for an interrupt, memory lock to be lifted, a state change of a memory object, or other input.

In some embodiments, a single process may be made up of many different functions. For example, process 104 is illustrated as having three functions. Each function may have a specific pattern of input objects that the function may consume and a pattern of output objects that the function may transmit. For example, process 104 has a function that consumes X, Y and transmits A, B at one location and transmits B, C at a second location. A second function consumes Y, Z and transmits A, C, and a third function consumes A, B, C and may not transmit any pattern. In still another example, process 107 may receive C, F and transmit H, K.

The values or objects represented by the letter combinations of X, Y in the example of embodiment 100 are used to illustrate any type of data object, interrupt, or information that may form a pattern that may match a message. The terminology is used here merely as a placeholder for a mechanism to define a pattern.

Each computer language may have its own mechanism for defining what a function may consume and transmit. In one example, a pattern may define a set of data types that a function may consume or transmit. In another example, a function may consume a specific interrupt or may be ready to launch when a memory object contains a specific value or range of values. Other computer languages may define data elements, addresses, interrupts, or other information that may be consumed and transmitted.

Some patterns may define data types that may be consumed at a hold point. The data types may define just a data type, a data type with a constant, or a data type with a pointer to a location for data. A pattern that defines just a data type may continue execution when any data matching the data type is received. Similarly, a pattern that defines a data type and a constant may proceed when data matching that data type and the value of the constant.

In situations where a pattern includes a pointer to a memory object, a process scheduler may traverse the pointer to extract a value for the data type at runtime. In such situations, the value of a data type may not be known at compile time and may be defined at runtime. Such values may change during runtime as well in some cases.

Some patterns may include references to a direct memory access location. The references may include a specific memory location or may include a pointer to a memory object that is a direct memory access location. A direct memory access location may be a memory location that may be accessed by peripheral devices independently of a central processing unit. An example may be a network interface card, storage device, input/output device, or other peripheral. These devices may read and write into a memory location, and an interrupt, daemon, or other monitoring agent may be fired.

In some embodiments, a pattern may point to a direct memory access location. In other embodiments, a daemon or other monitoring agent may determine that the direct memory access location may have changed, and the monitoring agent may generate a message that may be handled by the process scheduler.

The patterns in some embodiments may be executable expressions. In such embodiments, the patterns may be segments of executable code that define a comparison, state, or other condition that may be fulfilled by an incoming pattern. Such patterns may be very complex definitions of the information that a particular process receives at a hold point. Such patterns may be embedded into the executable code, then extracted at runtime and placed into a process array. A process scheduler may execute the patterns as part of the matching process to identify whether or not an incoming message meets the criteria for a process to proceed.

In some embodiments, each process 104, 106, and 107 may have pointers 108, 110, and 109, respectively, that may indicate a blocking point in the process. The pointers may refer to a function call or other position in a sequence of executable elements where the process has halted, awaiting input. At each pointer, there may be some definition of the input for which the process has halted.

A process array 112 may contain the patterns and process associated with each pointer. The process array 112 may be populated by a pattern extractor 111 that may determine that a process has been blocked or halted, extract the input that the halted process awaits, and place that information in a process array 112.

In the process array 112, an entry of a wait pattern X, Y from the process ASDF corresponds to pointer 108, and an entry of C, D, F from the process JKL corresponds to pointer 110.

The process array 112 may also include transmit patterns, which may refer to patterns that the process may transmit when the next function is executed. The transmit patterns may be extracted from the processes in the same manner as the wait patterns. The process array 112 includes transmit patterns A, C and X, Z, corresponding to processes ASDF and JKL, respectively.

In some embodiments, a process array 112 may permit a one-to-many relationship between a process and its output or transmit patterns. For example, the first function in process ASDF may have two transmit statements, meaning that two sets of output patterns may be present. Each output pattern may generate a separate message and may therefore comprise multiple entries in the process array 112.

The process array 112 may include both waiting processes and running processes. When both running processes and waiting processes are present, a process scheduler may traverse the process array 112 to identify upstream processes that may feed information to a waiting process. The process scheduler may then raise the priority of one or more upstream processes in order to speed up execution of the waiting process.

A pattern matcher 114 may receive incoming messages and attempt to match the incoming message to the pattern in the process array 112. When a match is found, the matching process may be moved to a runnable queue 122, and one of the processors 126 may resume executing the process. When a match is not found, the message may be moved to a message queue 120.

The pattern matcher 114 may also operate by receiving an idle process with an associated pattern. The pattern matcher 114 may compare the pattern to the messages in the message queue 120. If a match is found, the message may be communicated to the process, and the process may be moved to the runnable queue 122.

The message queue 120 may store messages that have no matching idle or waiting process. As changes are made to the process array 112, the message queue 120 may be scanned to attempt to match a newly idle process to a message in the message queue 120.

A monitoring agent 119 may create messages that a pattern matcher 114 may compare against the process array 112. The monitoring agent 119 may monitor interrupts and other inputs, then create a message for analysis by the pattern matcher 114. In some cases, the monitoring agent may monitor a direct memory access location and may create a message when the direct memory access location has new data. In another case, the monitoring agent may monitor a hardware interrupt and may create a message in response.

The messages 116 and 118 may have contents that may be matched against the process array 112 by the pattern matcher 114. The contents of message 116 contain C, D which may not match any process in the process array 112. Consequently, the pattern matcher 114 may move message 116 to the message queue 120.

The contents of message 118 may contain C, F which may match the process ZXC in the process array 112. In this condition, process ZXC may be moved to the runnable queue 122 to resume execution.

A process scheduler may examine the process array to determine that process ASDF is waiting for a pattern X, Y. The process scheduler may search for pattern X, Y in the transmit or output column to determine that process JKL can supply pattern X, Y, but that process JKL is in turn waiting for pattern C, D, F. Another iteration through the process array 112 may reveal that process QWER can supply the pattern C, D, F. The process scheduler may attempt to prioritize process QWER so that processes JKL and ASDF may execute sooner.

The runnable queue 122 may contain processes that may be retrieved by a processor 126 for execution. In some embodiments, each processor may have its own runnable queue 122. In other embodiments, multiple processors may share a single runnable queue 122, where any of the processors may be capable of executing a process in the runnable queue 122. In still other embodiments, a computer system may have multiple runnable queues, and some or all of the runnable queues may be shared by multiple processors.

The pattern matcher 114 may compare messages with patterns extracted from the waiting processes. The comparison may occur without having to awaken the idle processes, which may be useful in computing systems that use large numbers of independent processes. One example of such systems may be functional programming systems, where a single application may have many hundreds, thousands, or even millions of independent functions.

A functional programming paradigm may have a notion of independent functions or processes. A functional process may consume inputs and produce outputs but may not change the state of other memory objects. In some embodiments, the processes may be rigidly defined as functional processes. Such embodiments may include functional programming languages, such as Erlang, Scala, F#, Lisp, Clojure, OCaml, Haskell, and others. In some cases, the processes may be written in a functional programming style where the programmer may adhere to a functional style even though a language, compiler, or other constraint may not enforce the functional style.

Imperative programming paradigms are those that define computation in terms of statements that change a program state. Examples of imperative programming languages include FORTRAN, BASIC, COBAL, as well as object oriented languages such as C, C++, C#, Perl, Python, PHP, Java, Ruby, and others. Imperative programming languages may perform message passing explicitly through library functions or other commands that pass explicit messages from one process to another. Imperative programming languages may also create implied messages using locks on memory objects or other resources. Other communications between processes may also be treated as messages.

Figure 2:
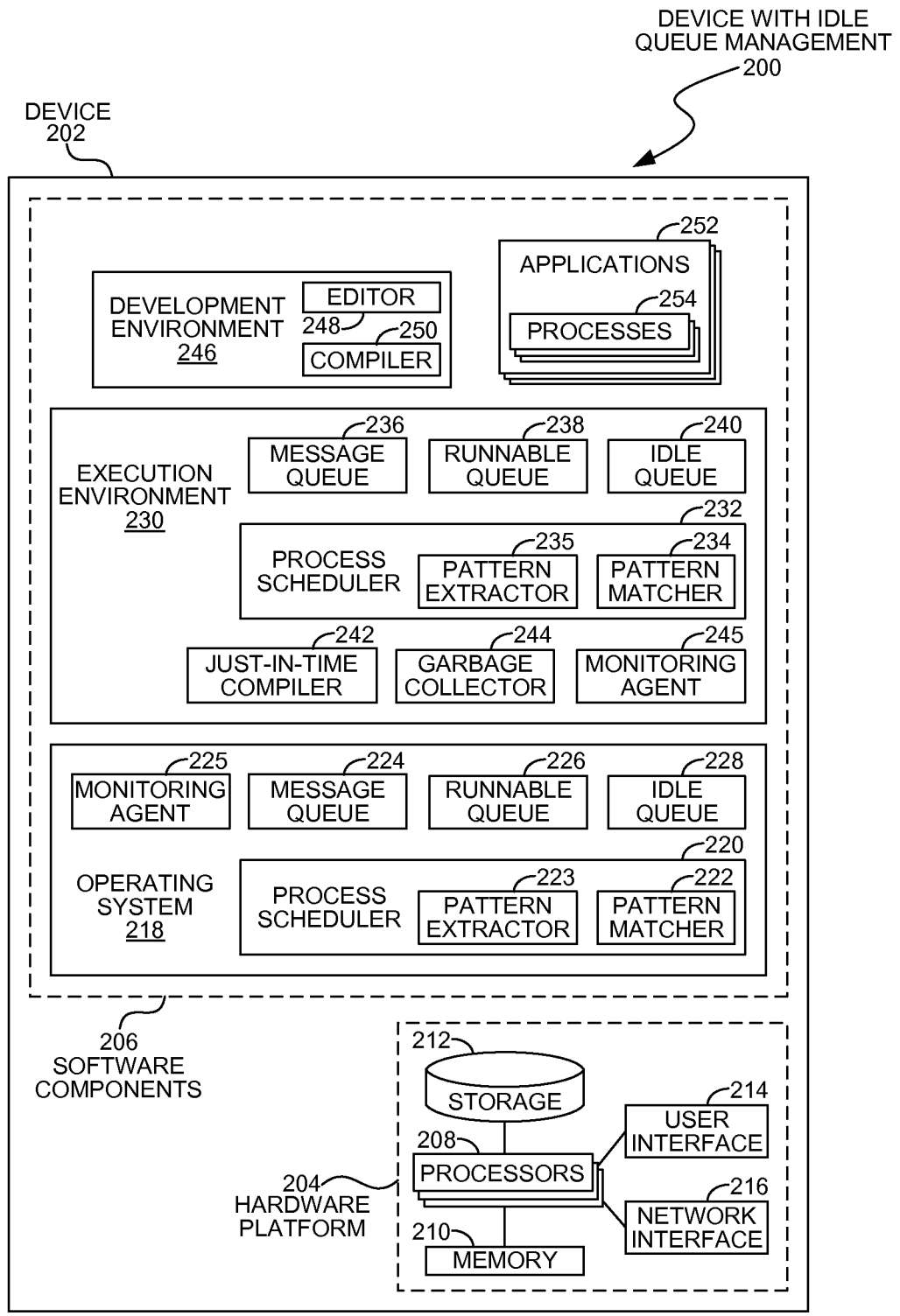
FIG. 2 is a diagram illustration of an embodiment showing a device with idle queue management.

FIG. 2 is a diagram of an embodiment 200 showing a computer system that may deploy a pattern matching system in a process scheduler. The pattern matching system may analyze inputs for which idle or blocked processes may be waiting. The pattern matching process may operate without awakening a blocked process.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various applications 252 and services may operate. An operating system may provide an abstraction layer between executing routines and the hardware components 204, and may include various routines and functions that communicate directly with various hardware components.

The operating system 218 may include a process scheduler 220, as well as other components. The operating system 218 may be an environment in which applications 252 may be executed. Each of the applications 252 may contain multiple processes 254 that may relate to each other.

The process scheduler 220 may cause the various processes 254 to be executed on the hardware platform 204. The process scheduler 220 may determine when a specific process is to be launched and may allocate or provision resources for the process. The process scheduler 220 may manage the execution of the processes by facilitating message passing between the processes. In some embodiments, the message passing may be explicit or implicit. Explicit message passing systems may have distinct messages that are routed to a receiving process, while implicit message passing embodiments may perform similar functions without the discrete messages.

The process scheduler 220 may have a pattern extractor 223. The pattern extractor 223 may be capable of determining input and output patterns for processes that may be executing or for processes that may be in a hold state. The pattern extractor 223 may examine source code, intermediate code, executable code, metadata, or other source to determine either or both of the input and output patterns.

The process scheduler 220 may have a pattern matcher 222 which may compare messages with waiting processes. When the pattern matcher 222 identifies a waiting process that may consume the message, the pattern matcher 222 may move the process to a runnable queue 226. When the pattern matcher 222 does not successfully match a message, the message may be moved to a message queue 224 for later processing.

The process scheduler 220 may identify processes that are waiting or have become blocked, and may place the processes in an idle queue 228. When processes are placed in the idle queue 228, the process scheduler 220 may also extract a pattern representing data, interrupts, or other information for which the process is waiting. The pattern may be placed in a process array for comparisons with messages in the message queue 224 or for comparisons with incoming messages.

A monitoring agent 225 may be an operating system function that may create messages from interrupts, changes in direct memory access locations, or other actions. The monitoring agent 225 may be a daemon, application, or other software element.

In some embodiments, the process scheduler 220 may be part of an operating system 218. In other embodiments, the process scheduler 232 may be part of an execution environment 230.

The execution environment 230 may be separate from the operating system 218 and may be a virtual machine or other software construct that may manage execution of applications 252. In some embodiments, the execution environment 230 may have a just-in-time compiler 242, garbage collector 244, and other management functions.

The execution environment 230 may have a process scheduler 232 that includes a pattern matcher 234 and a pattern extractor 235. The execution environment 230 may also have a message queue 236, runnable queue 238, and an idle queue 240. The execution environment 230 may also include a monitoring agent 245.

In some embodiments, a development environment 246 may be used by a developer or programmer to create applications 252. The development environment 246 may include an editor 248 where a programmer may create and modify source code, as well as a compiler 250 that may compile the source code into executable code. In some cases, the compiler 250 may create intermediate code that may be further compiled, such as intermediate code that may be compiled with a just-in-time compiler 242.

The compiler 242 may identify and extract pattern information from source code during compiling. The pattern information may be included in the compiled code or stored in a separate metadata file. In such embodiments, a process scheduler may access the stored pattern information when a process has halted, then use the stored pattern information to compare with messages.

Figure 3:
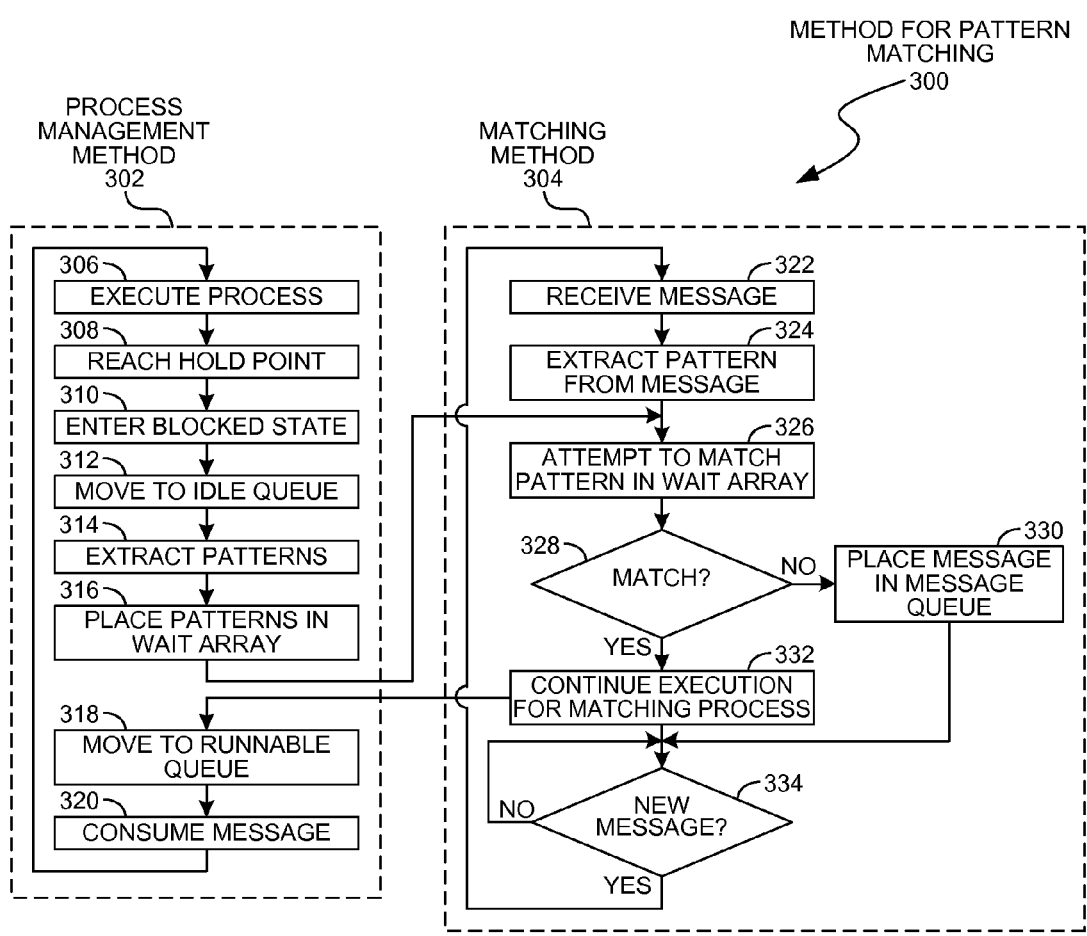
FIG. 3 is a flowchart illustration of an embodiment showing a method for matching messages to halted processes.

FIG. 3 is a flowchart illustration of an embodiment 300 showing a method for pattern matching. Embodiment 300 illustrates one method that may be performed by a process scheduler and a pattern matcher, such as the process schedulers 220 and 230, and the pattern matchers 222, and 232.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method that may be performed by a process scheduler and a pattern matcher. The process management method 302 may be performed by a process scheduler and may manage the various items in the idle queue and runnable queue. The matching method 304 may compare messages to patterns extracted from processes, and may disposition messages or processes accordingly.

The process management method 302 may begin when a process is executed in block 306. The process may execute until the process reaches a hold point in block 308, at which time the process may enter a blocked state in block 310 and be moved to an idle queue in block 312.

The blocked state may be where a process awaits an input from some other source. In some situations, the input may be in the form of an explicit message, while other situations the input may be in the form of a blocked memory object, interrupt, or other input.

Patterns may be extracted by a process scheduler in block 314. In some cases, the pattern may be extracted from executable code for the process. In other cases, a metadata file or other source may contain the pattern that may be referenced by the process scheduler when a blocked state may be encountered. The patterns may include both input and output patterns for a process.

In some embodiments, a compiler may extract the patterns during compilation, and may then embed the patterns in the executable code. Such a compiler may store the embedded patterns in a manner so that the process scheduler may quickly identify a pattern at each potential hold location.

The extracted patterns may be placed in a process array in block 316.

Once a pattern is matched by the matching method 304, the process may be moved to a runnable queue in block 318 and the message may be consumed by the process in block 320 as it continues execution in block 306.

The pattern matcher may execute the matching method 304.

In block 322, a message may be received. The pattern associated with the message may be extracted in block 324.

In block 326, the pattern from the message may be attempted to be matched to patterns in the process array. If there is no match in block 328, the message may be placed in a message queue in block 330. If the match is successful in block 328, the matching process may resume execution in block 332. The process to continue execution may be to move the process to the runnable queue in block 318 and continue execution.

The pattern matcher may loop in block 334 until a new message may be received. When a new message is received in block 334, the process may continue in block 322.

A single message queue may contain all the messages that have not been matched by a pattern matcher. In other embodiments, a separate message queue may be assigned to each process. Embodiments with a single message queue may or may not use messages that are addressed to a specific recipient process.

Some programming paradigms identify a recipient process for each message transmitted. In such paradigms, a transmitting process may determine that a specific process will consume a data set, interrupt, or other message, then transmit that message to the specific recipient process.

Other programming paradigms may not identify which process will consume a message, if any at all. Such paradigms may be classified as a publication/subscription system where a recipient process may subscribe to a particular data feed defined by a pattern. In some such system, two or more recipient processes may receive a single transmitted message.

The pattern matcher may respond to either new messages in block 334 or to new processes that are halted in block 326. In either case, an attempt may be made to match patterns in the process array and cause a waiting process to continue when the match is successful.

Figure 4:
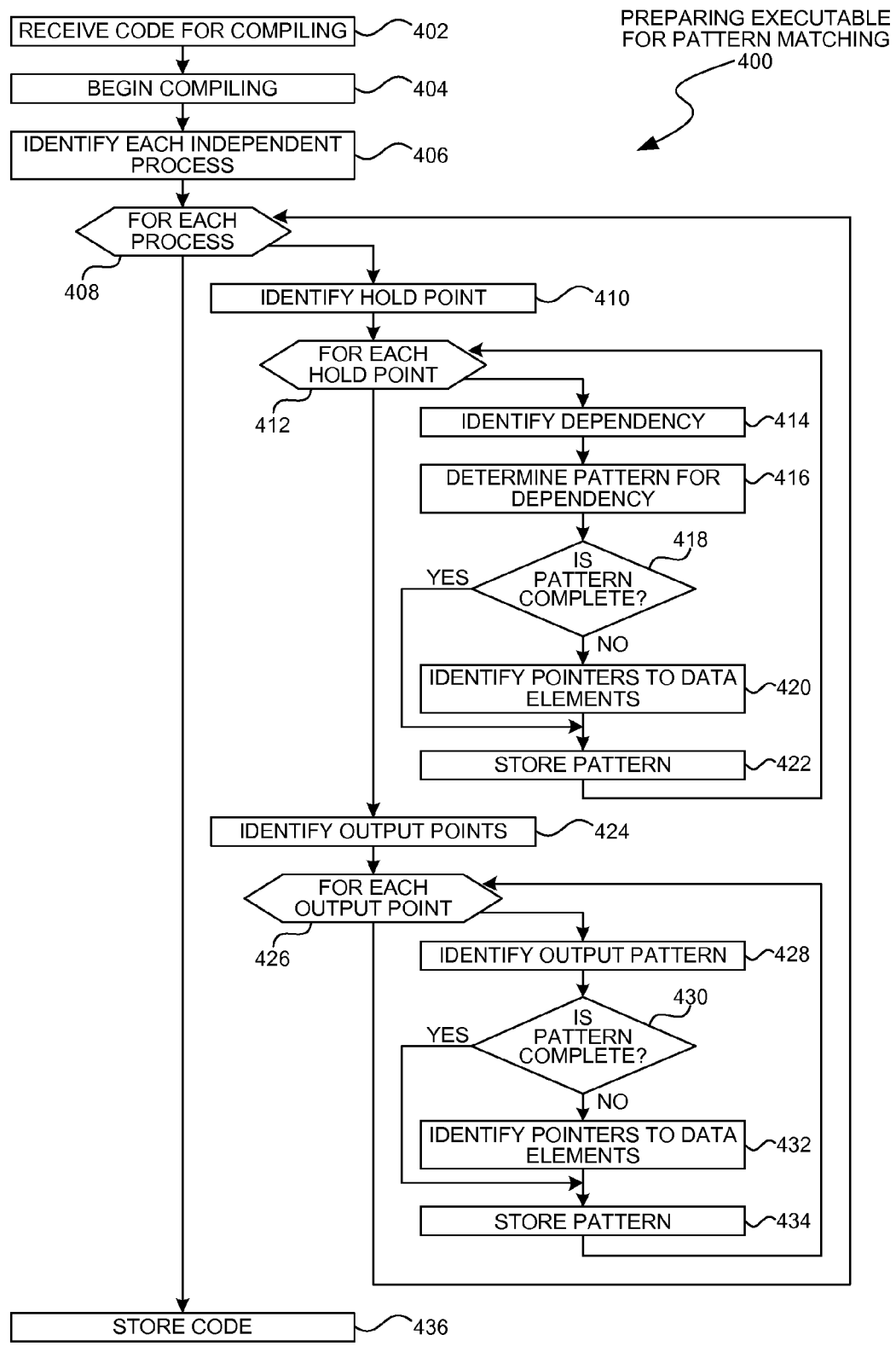
FIG. 4 is a flowchart illustration of an embodiment showing a method for preparing executable code for pattern matching.

FIG. 4 is a flowchart illustration of an embodiment 400 showing a method for preparing executable code for pattern matching. Embodiment 400 illustrates one method the may be performed by a compiler for identifying potential hold points, then embedding the patterns in a manner such that a process scheduler may retrieve the patterns.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The process of embodiment 400 may be performed at compile time to identify patterns that may be extracted at hold and at transmit points. The embodiment 400 may be performed at any compilation or analysis of code. In some cases, embodiment 400 may be performed when compiling from source code to executable code, while at other cases, embodiment 400 may be performed when compiling from source code to intermediate code, or from intermediate code to executable code.

The code may be received in block 402 for compiling, which may begin in block 404. During compiling, each independent process may be identified in block 406.

For each process in block 406, potential hold points may be identified. For each hold point in block 412, a dependency for the hold point may be identified in block 414. A pattern for the dependency may be determined in block 416.

In some cases, the pattern may define specific data elements that may make up a pattern. In other cases, the pattern may relate to data elements that may be known at runtime. When the data elements are fully defined, the pattern may be considered complete. When some or all of the data elements are defined at runtime, the pattern may be considered incomplete.

When the pattern is incomplete in block 418, pointers to the data elements may be identified in block 420.

The pattern may be stored in block 422. In some embodiments, the pattern may be embedded in the executable code. In other embodiments, the pattern may be stored in a separate file or database associated with the executable code.

In block 424, potential output points may be identified. For each output point in block 426, the output pattern may be identified in block 428. If the pattern is not complete in block 430, pointers to the data elements represented in the pattern may be created in block 432. The pattern may be stored in block 434.

After analyzing all of the hold points for all of the processes, the executable code may be stored in block 436 in preparation for execution.

Figure 5:
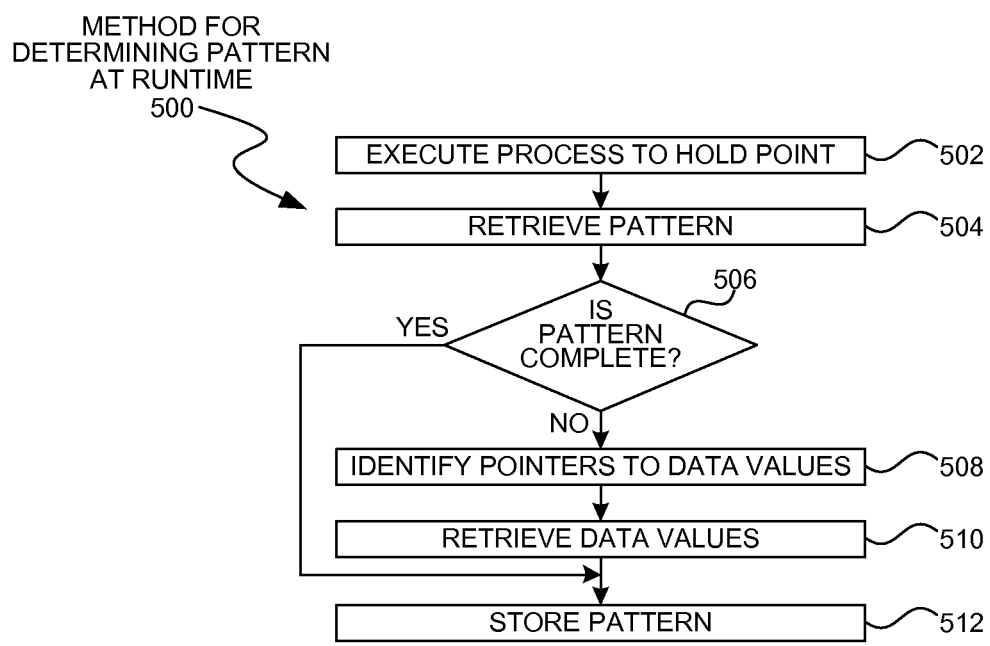
FIG. 5 is a flowchart illustration of an embodiment showing a method for determining a pattern at runtime.

FIG. 5 is a flowchart illustration of an embodiment 500 showing a method for extracting a pattern from a halted process. Embodiment 500 illustrates one method for determining a pattern by traversing pointers to data values. Such an embodiment may be useful when a pattern may not be fully defined at compile time and where some of the portions of the pattern may be defined at runtime.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A process may execute until a hold point in block 502. At the hold point, a pattern may be retrieved in block 504. In some cases, the pattern may be retrieved from the executable code, while in other cases the pattern may be retrieved from a metadata file, database, or other source.

If the pattern is complete in block 506, the pattern may be stored in block 512. If the pattern is not complete in block 506, pointers to data values for the pattern may be identified in block 508. The data values may be retrieved in block 510 and the pattern stored in block 512.

Embodiment 500 is an example of a process that may be performed when some of the data values for a pattern may be defined at runtime.

Figure 6:
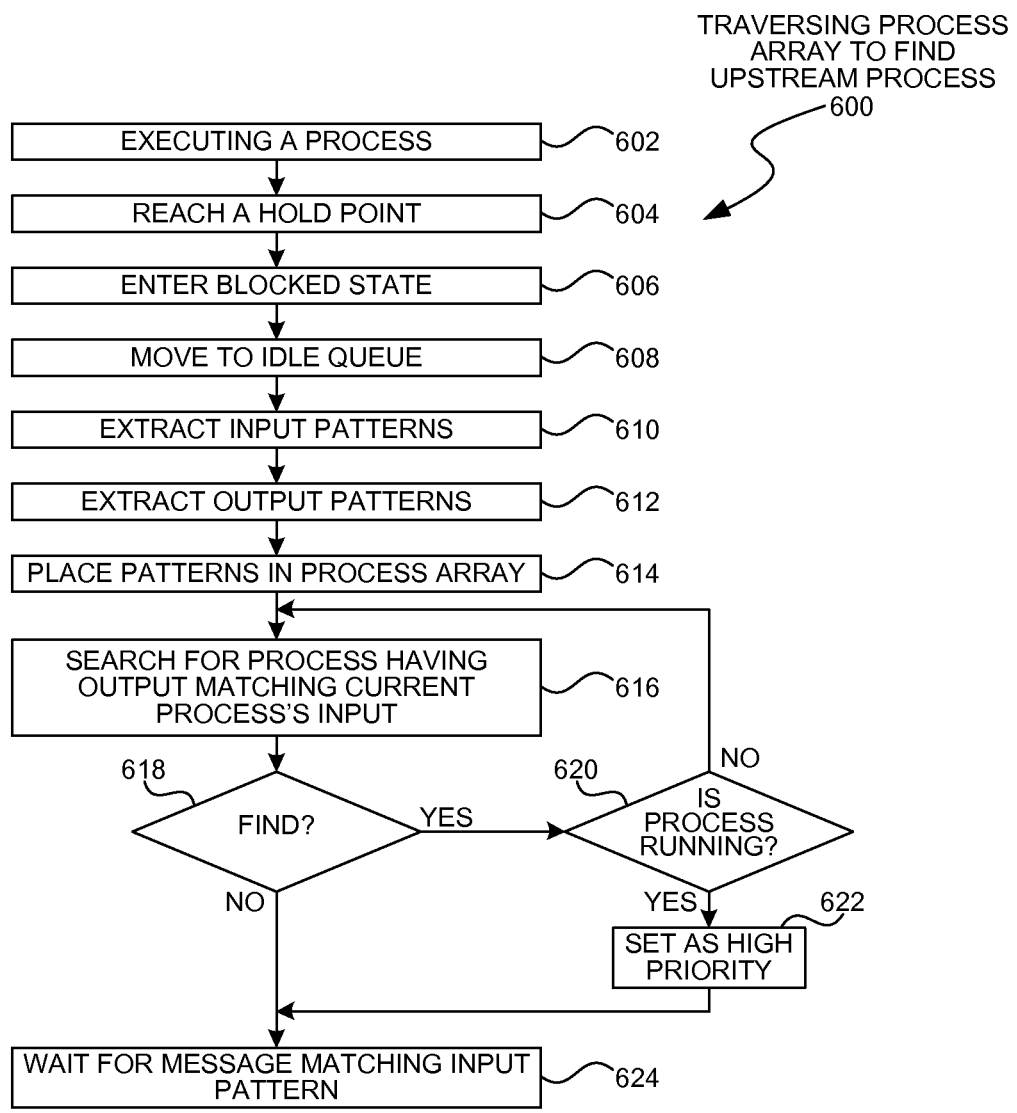
FIG. 6 is a flowchart illustration of an embodiment showing a method for traversing a process array to find upstream processes.

FIG. 6 is a flowchart illustration of an embodiment 600 showing a method for traversing a process array to find upstream processes. Embodiment 600 illustrates a mechanism for recursively examining a process array to identify a chain of upstream processes for a given halted process. Once the upstream processes are identified, the processes may be expedited or prioritized so that the waiting process may be executed quickly.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A process may be executed in block 602 until the process reaches a hold point in block 604. The process may enter a hold state in block 606, and may be moved to an idle queue in block 608.

The input patterns may be extracted from the process in block 616, as well as the output patterns in block 612. The patterns may be placed in a process array in block 614.

The process array may be traversed in block 616 to identify processes having an output that matches the current process's input. When a match is found in block 618 and the newly identified process is running in block 620, the upstream process may be set as a high priority in block 622.

If an upstream process is not running in block 620, the process may return to block 616 to recursively examine inputs for the upstream process. The loop of blocks 616 through 620 may be repeated several times until an executing process may be identified. Each time the loop may be performed, an upstream dependency may be identified.

Once the upstream process has been set to a higher priority in block 622, the current process may wait in block 624 for a message that allows the process to continue. In the event that the search in block 616 did not identify any upstream processes, the process may also wait in block 624 for a message that allows the process to continue.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

```
      receive [{SameAtom, LowerInt}, {SameAtom, HigherFloat}] when
          is_integer(LowerInt) and is_float(HigherFloat) and
          LowerInt < HigherFloat ->
              void
      end.
      receive __ker0
      match_spec
{[{'$1','$2'},[{'$3','$4'},[ ]]],[{'and',{'=:=','$3','$1'},{'<',{'and',
{'and',{is_integer,'$2'},{is_float,'$4'}},'$2'},'$4'}},[ ]],[true,[ ]]}
      alt
          select __ker0
    type k_cons
      [__ker3|__ker2] ->
      select __ker3
          type k_tuple
    {__ker5,__ker4} ->
      select __ker2
          type k_cons
      [__ker7|__ker6] ->
    select __ker7
        type k_tuple
    {__ker9,__ker8} ->
        select __ker6
    type k_nil
      [ ] ->
        when
    try
      do
      bif (remote 'erlang':'=:='/2)(__ker9, __ker5) >> <__cor5>
      then
      do
      try
        do
bif (remote 'erlang':'is_integer'/1)(__ker4) >> <__cor1>
      then
      do
bif (remote 'erlang':'is_float'/1)(__ker8) >> <__cor0>
      then
      do
bif (remote 'erlang':'and'/2)(__cor1, __cor0) >> <__cor2>
      then
      do
bif (remote 'erlang':'and'/2)(__cor2, __ker4) >> <__cor3>
      then
        bif (remote 'erlang':'<'/2)(__cor3, __ker8) >> <__cor6>
      of Try
        Try
        catch T, R
        'false'
        end
      then
      do
        bif (remote 'erlang':'and'/2)(__cor5, __cor6) >> <__ker11>
      then
      test (remote 'erlang':'=:='/2)(__ker11, 'true')
```

```
      of __ker10
        __ker10
      catch
        'false'
      end
      ->
      do
        receive_accept
      then
      <<'void'>>
        receive_next
      after 'infinity' ->
        <<'true'>>
```

What is claimed is:

1. A method performed as part of an operating system, said method comprising:
   executing a first process on a computer processor, said first process comprising a plurality of functions and said first process being managed by said operating system;
   determining that a first function is waiting for a first input, said first input being defined by a first pattern and setting said first process to a blocked state;
   receiving a first message, said first message comprising first data;
   while said first process is in said blocked state, attempting to match said first data in said first pattern;
   when said first data matches said first pattern, causing said first process to resume execution; and
   when said first data does not match said first pattern, leaving said first process in said blocked state;
   when said first data matches said first pattern, setting said first process in a runnable state;
   when said first data matches said first pattern, moving said first process to a priority position in a runnable queue.

2. The method of claim 1 further comprising:
   when said first data does not match said first pattern, adding said first message to a message queue.

3. The method of claim 2 further comprising:
   matching said second pattern to a second message; and
   causing said second function to execute using said second data in said second message.

4. The method of claim 3 further comprising:
   when said first data matches said first pattern, placing said first process in a runnable queue.

5. The method of claim 1 further comprising:
   determining that a second function is waiting for said second input, said second input being defined by a second pattern, said second function being comprised in said first process; and attempting to match said second pattern to second data associated with messages in said message queue.

6. The method of claim 1, said first process being written in a functional language.

7. The method of claim 1, said functional language being one of a group composed of: Erlang; Scala; F#; Lisp; Clojure; OCaml; and Haskell.

8. The method of claim 1, said first process being written in an imperative language.

9. A system comprising:
   a computer processor; a message passing system that receives messages from executing processes and passes said messages to other processes;
   a runnable queue comprising processes ready for execution;

a process scheduler that:
  causes a first process to execute on said computer processor, said first process comprising a plurality of functions;
  determines that a first function is waiting for a first input, said first input being defined by a first pattern and setting said first process to a blocked state;
  receives a first message, said first message comprising first data for said first process;
    attempts to match said first data to said first pattern;
    when said first data matches said first pattern, causes said first process to resume execution; and
    when said first data does not match said first pattern, leaves said first process in said blocked state; said process scheduler being a component of an operating system;
  said process scheduler that further:
when said first data matches said first pattern, places said first process in said runnable queue process scheduler that further:
  when said first data matches said first pattern, moves said first process to a priority position in said runnable queue.

10. The system of claim 9 further comprising:
  a message queue;
  said process scheduler that further:
    when said first data does not match said first pattern, adds said first message to a message queue.

11. The system of claim 10, said message queue containing messages only for said first process.

12. The system of claim 9, said process scheduler that further:
  determines that a second function is waiting for said second input, said second input being defined by a second pattern, said second function being comprised in said first process; and
  attempts to match said second pattern to second data associated with messages in said message queue.

13. The system of claim 12, said process scheduler that further:
  matches said second pattern to a second message; and
  causes said second function to execute using said second data in said second message.

14. The system of claim 9, said process scheduler that further:
  when said first data matches said first pattern, sets said first process in a runnable state.

15. The system of claim 9, said first process being written in a functional language.

16. The system of claim 15, said functional language being one of a group composed of:
  Erlang;
  Scala;
  F#;
  Lisp;
  Clojure;
  OCaml; and
  Haskell.

17. The system of claim 9, said first process being written in an imperative language.

18. A method performed by an operating system, said method comprising:
  executing a first process on a first computer processor, said first process comprising a plurality of functions, said first process being managed by said operating system; during said executing, maintaining an execution pointer at a currently executing location within said first process;
  determining that a first function is waiting for a first input, said first input being defined by a first pattern and setting said first process to a blocked state, and storing said execution pointer at said first function; receiving a first message, said first message being addressed to said first process; examining said execution pointer to identify said first pattern; comparing said first pattern to said first message while said first process is in said blocked state;
  when said first data matches said first pattern, causing said first process to resume execution and to consume said first message;
  when said first data matches said first pattern, setting said first process in a runnable state;
  when said first data matches said first pattern, moving said first process to a priority position in said runnable queue.

19. The method of claim 18 further comprising:
  receiving a second message, said second message being addressed to said first process;
  examining said execution pointer to identify said first pattern;
  comparing said first pattern to said second message while said first process is in said blocked state; and
  when said second data does not match said first pattern, causing said first process to remain in said blocked state.

20. The method of claim 18 further comprising:
  when said first data matches said first pattern, moving said first process into a runnable queue.

21. The method of claim 18 further comprising:
  when determining that said first function is waiting for said first input, removing said first process from a runnable queue.

22. The method of claim 21 further comprising:
  placing said first function in an idle queue.

23. The method of claim 22 further comprising:
  when causing said first process to resume execution, moving said first process into a runnable queue.

24. The method of claim 23:
  said first process being executed on said first computer processor prior to being placed in a blocked state; and
  executing said first process on a second computer processor after being placed into said runnable queue.

* * * * *